United States Patent [19]

Ishino et al.

[11] Patent Number: 4,699,239
[45] Date of Patent: Oct. 13, 1987

[54] DRIVING CONTROL DEVICE OF A CRAWLER TYPE TRACTOR

[75] Inventors: Tsutomu Ishino, Hirakata; Hideo Omatsu, Katano; Takao Shiraishi, Hiratsuka; Hideaki Kawakami, Fujisawa, all of Japan

[73] Assignee: Kabushiki Kaisha Komatsu Seisakusho, Tokyo, Japan

[21] Appl. No.: 622,794

[22] Filed: Jun. 21, 1984

[30] Foreign Application Priority Data

Jun. 24, 1983 [JP] Japan ................. 58-113786

[51] Int. Cl.$^4$ ........................... B60K 26/00
[52] U.S. Cl. .................. 180/315; 100/6.7; 100/336; 364/424
[58] Field of Search ............... 180/6.7, 315, 336; 192/13 A, 13 R, 9, 4 A; 364/424, 424.1, 425, 426

[56] References Cited

U.S. PATENT DOCUMENTS

| 3,245,493 | 4/1966 | Barrett, Jr. ............... 364/425 |
| 3,785,450 | 1/1974 | Suzuli ....................... 180/6.7 |
| 4,098,367 | 7/1978 | Fleischer ................... 364/224 |
| 4,142,600 | 3/1979 | Campbell ................... 180/336 |
| 4,191,270 | 3/1980 | Monteith ................... 180/315 |

FOREIGN PATENT DOCUMENTS

| 1630579 | 4/1962 | Fed. Rep. of Germany . |
| 3111610 | 3/1981 | Fed. Rep. of Germany . |
| 2351844 | 12/1977 | France . |
| 0001229 | 6/1980 | Japan ................. 180/315 |
| 0050869 | 5/1981 | Japan ................. 180/6.7 |
| 0635278 | 3/1983 | Liechtenstein .......... 180/336 |
| 1188545 | 6/1967 | United Kingdom . |
| 2062781 | 5/1981 | United Kingdom . |

OTHER PUBLICATIONS

French Search Report.

Primary Examiner—Samuel Scott
Assistant Examiner—H. A. Odar
Attorney, Agent, or Firm—Spensley Horn Jubas & Lubitz

[57] ABSTRACT

A driving control device in a crawler type tractor comprises a lever capable of being operated in the forward or reverse (backward) direction and capable of being operated in the right or left direction when the lever is operated so as to move to the end of the forward or reverse direction, and a speed-stage command device capable of generating and transmitting commands for speed stages for the forward and the reverse directions. When a first sensor detects the lever operation in the forward or reverse direction; the transmission speed stages can be selected in accordance with the first sensor output and the output of the speedstage command device, and the operation amount of the lever in the right or left direction is detected by a second sensor so that steering clutches of the tractor can be controlled in accordance with the output of the second sensor.

6 Claims, 8 Drawing Figures

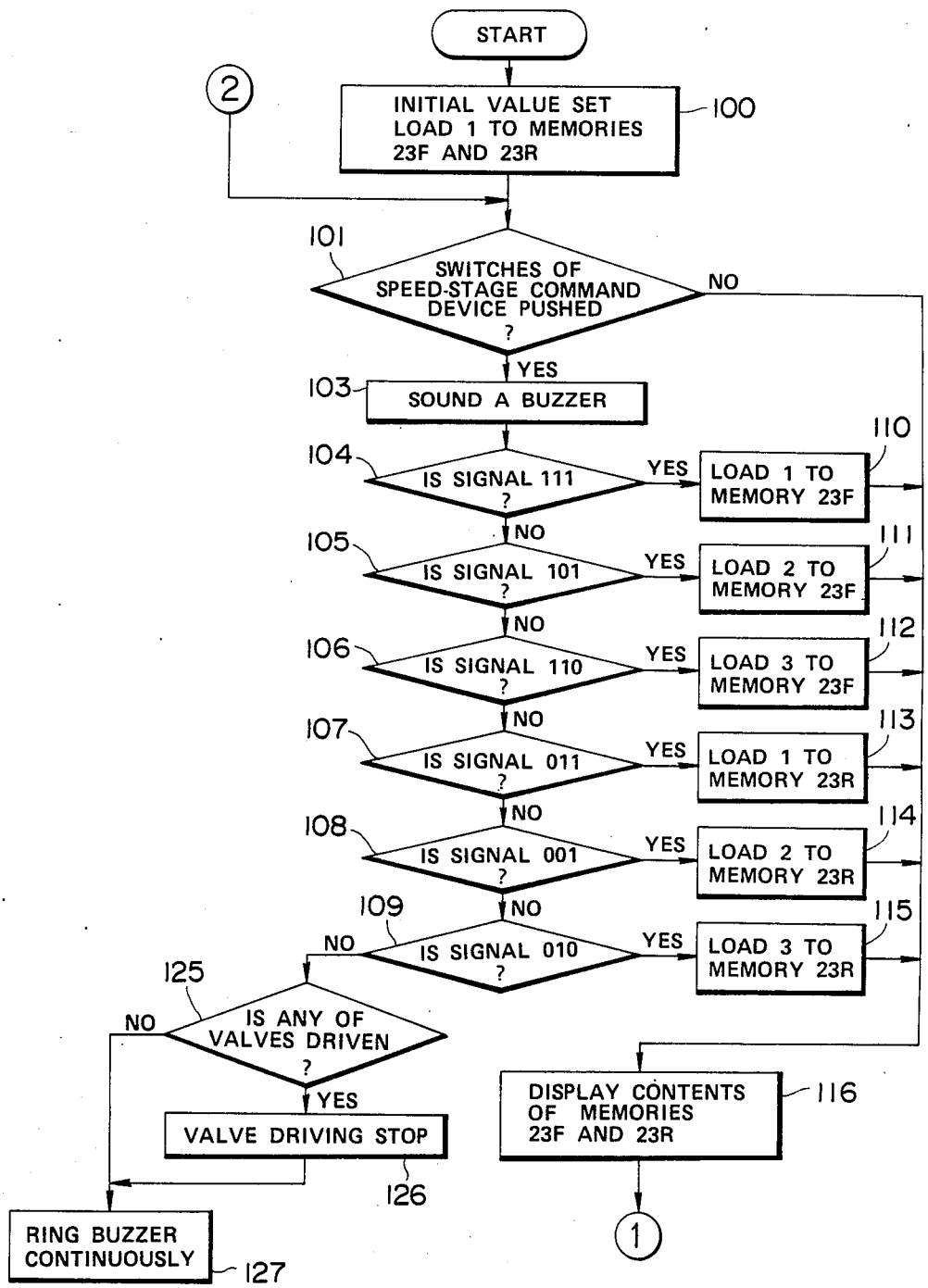

DRIVING CONTROL DEVICE OF A CRAWLER TYPE TRACTOR

BACKGROUND OF THE INVENTION

1. Field of Invention

The present invention relates to an apparatus for controlling electrically the driving system in a crawler-type tractor of bulldozers or the like.

2. Prior Art

The conventional tractor, as shown in FIG. 1, is provided with both a right-turning steering lever 2R and a left-turning steering lever 2L near the operator's seat 1, these levers 2R and 2L being linked to respective steering valves controlling a right steering clutch and a left steering clutch (not shown in the figure). Accordingly the tractor can be turned to a desired direction by selecting and operating either of the above levers 2R and 2L.

The tractor is further provided near the above steering levers 2R and 2L with a transmission lever 3, which is linked to a speed-stage selecting valve of the transmission not shown in the figure so that the transmission speed stages can be selected by operating the transmission lever 3 in accordance with the shift pattern as illustrated in FIG. 2.

In FIG. 1, reference numerals 4, 5 and 6 designate a lever for controlling a blade (bulldozer blade) not shown in the figure, a brake pedal, and an accelerator pedal, respectively.

In the driving of this conventional tractor, selecting and operating the two steering levers 2R and 2L according to the turning direction of the tractor is troublesome for the operator. Accordingly it is desirable that turning to the right or left direction can be done by operating only one lever. However, if this one lever is linked to each of the right and left steering valves, the lever is subjected to very heavy loads so that it will be difficult to perform such an operation quickly and exactly. Thus, under such circumstances, the separate right and left steering levers 2R and 2L as described above are inevitably used.

In a conventional tractor, its forward or backward movement is selected by the transmission lever 3. Therefore, when, for example, the tractor moving forward is to be driven in backward and its steering direction is to be changed, at least two levers including the transmission lever 3 must be operated. This has increased the effort on the operator.

SUMMARY OF THE INVENTION

In view of the inconvenience of the driving operation of the conventional tractor as stated above, an object of this invention is to provide in a crawler-type tractor a control device capable of performing steering operation and forward or reverse (backward) selecting operation by the use of a single lever.

According to the present invention there is provided a driving control device comprising a lever which can be operated in the forward or reverse direction and can be operated in the right or left direction when it is operated in the forward or reverse direction; a first sensor which outputs a forward instruction signal or a reverse instruction signal when the lever is moved to the forward or the reverse position; a second sensor which outputs a turning instruction signal corresponding to the operated amount of the lever in the right or left direction; a speed-stage command device which gives an instruction for speed stage by switching operation; a memory which stores instruction contents of the speedstage command device; means for driving the transmission of the tractor on the basis of the memory contents stored in the memory and the output signal of the first sensor; and means for driving steering clutches on the basis of the output signal of the second sensor.

BRIEF DESCRIPTION OF THE DRAWINGS

In the drawings:

FIG. 6A-6C is a flow chart for describing the operation of the device shown in FIG. 5.

DETAILED DESCRIPTION

Figure 1:
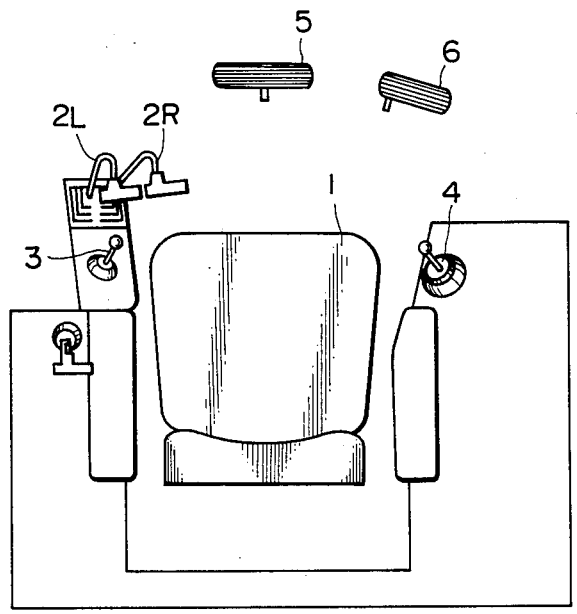
FIG. 1 is a plan view schematically showing the arrangement of controls near the operator's seat in the conventional crawler-type type tractor.
Figure 2:
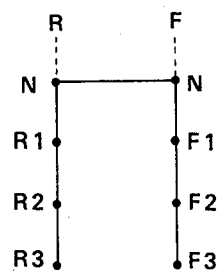
FIG. 2 is a diagram showing the operation pattern of the transmission lever of the conventional type shown in FIG. 1.
Figure 3:
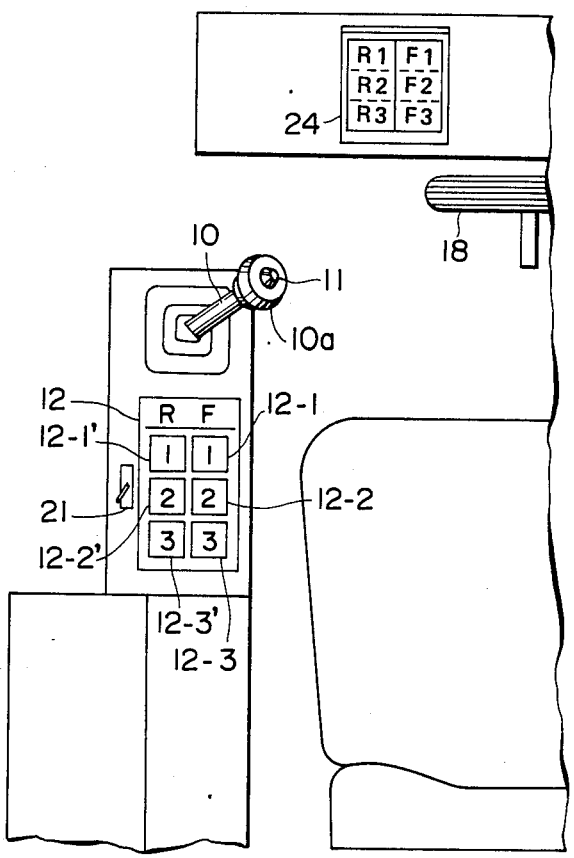
FIG. 3 is a fragmentary plan view schematically showing the arrangement of controls near the operator's seat in a crawler-type tractor to be controlled by the device according to the present invention.

FIG. 3 schematically shows the arrangement of the controls provided near the operator's seat of the crawler-type tractor to be controlled by the device of the present invention.

Figure 4:
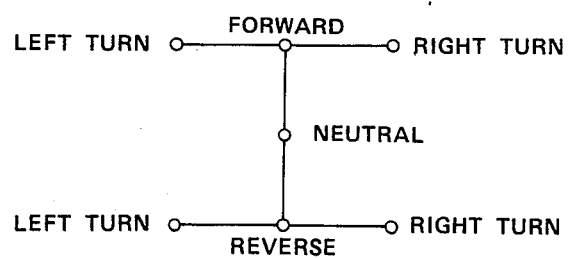
FIG. 4 is a diagram showing the operation pattern of the lever according to the present invention shown in FIG. 3.

A lever 10 shown in the same figure is supported so as to be operable according to the operation pattern shown in FIG. 4, and a knob 10a thereof is provided with a push switch 11. A speed-stage command device 12 commands speed stages (R1, R2, R3, F1, F2 and F3) of the transmission (not shown) and is provided with push button switches 12-1, 12-2, 12-3 and 12-1', 12-2', 12-3' corresponding to respective speed stages with respect to forward or backward travel. These push button switches are of normal-open type.

Figure 5:
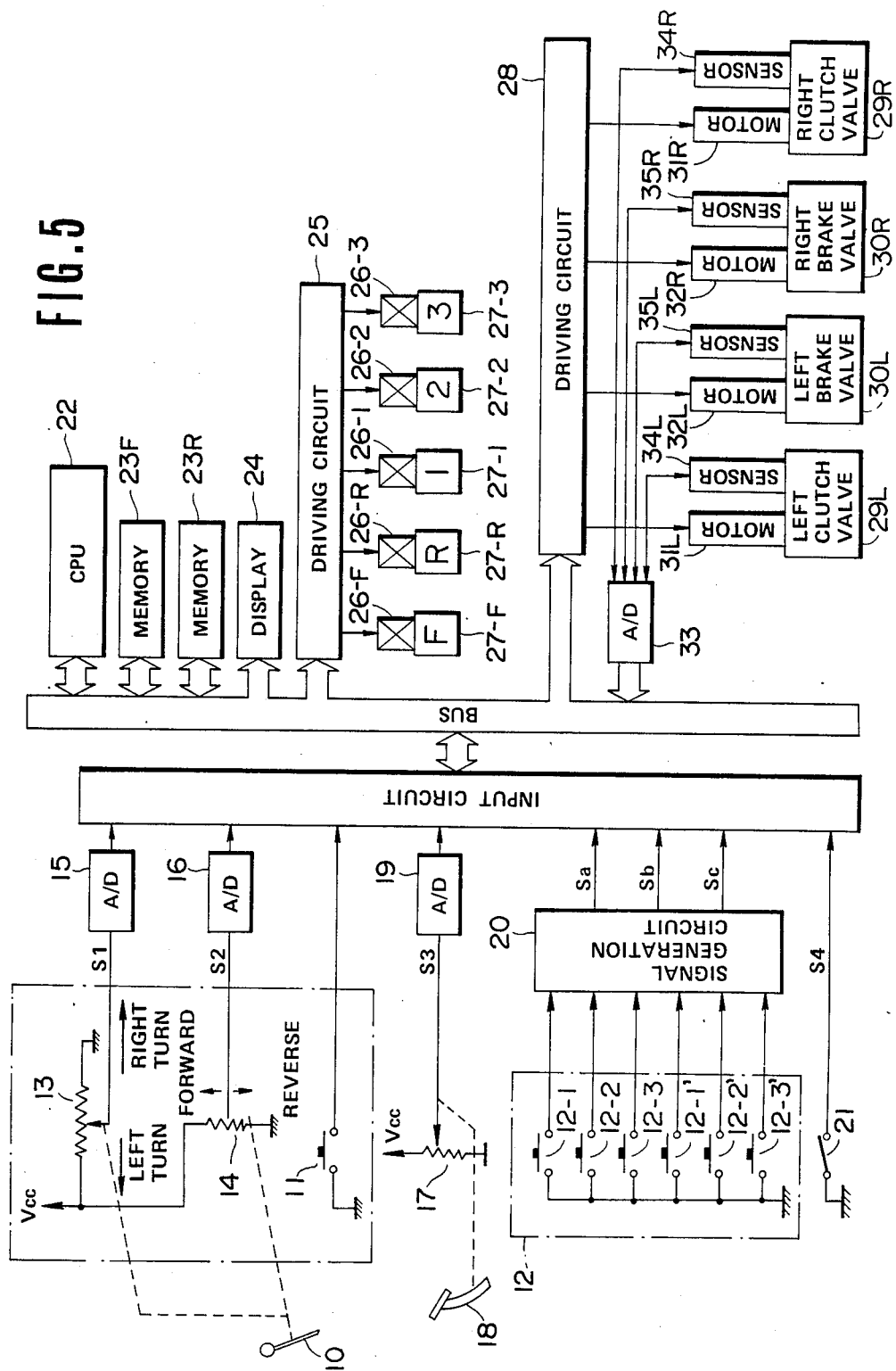
FIG. 5 is a block diagram showing an embodiment of the control system of the present invention.

FIG. 5 is a block diagram showing an example of the control device of the present invention for controlling the transmission and steering of the crawler-type tractor.

In the same figure, when the lever 10 is operated to the "right turn" position or the "left turn" position of the operation pattern as shown in FIG. 4, a potentiometer 13 outputs a voltage signal S1 of the value corresponding to the operated amount with respect to these directions. Furthermore, when the lever 10 is operated from the neutral position in the above pattern to the "forward" position or the "reverse" position, a potentiometer 14 outputs a voltage signal S2 of a value corresponding to the operated amount with respect to these directions, the output signals S1 and S2 of these potentiometers 13 and 14 being converted into digital values by respective analogue-to-digital converters 15 and 16 (hereafter referred to as A/D converters).

A potentiometer 17 outputs a voltage signal S3 corresponding to the operated amount of a brake pedal 18 (refer to FIG. 3), the output signal S3 being inputted into an A/D converter 19.

A signal generation circuit 20 generates parallel signals Sa, Sb and Sc of logic levels as shown in the following Table in response to the operation of the push button switches 12-1, 12-2 and 12-3 and 12-1', 12-2' and 12-3' in the speed-stage command device 12.

|     |       | Sa | Sb | Sc |
|-----|-------|----|----|----|
| F 1 | 12-1  | 1  | 1  | 1  |
| F 2 | 12-2  | 1  | 0  | 1  |
| F 3 | 12-3  | 1  | 1  | 0  |
| R 1 | 12-1' | 0  | 1  | 1  |
| R 2 | 12-2' | 0  | 0  | 1  |
| R 3 | 12-3' | 0  | 1  | 0  |

Since this signal generation circuit 20 can be easily constructed by using logic circuits such as an AND circuit, OR circuit, and inverter, description of the circuit configuration is omitted here.

A neutral lock switch 21 operates to output a signal S4 which urges the transmission to come to its neutral position and is located at the side of the speed-stage command device 12 as shown in FIG. 3.

A central processing unit 22 (hereinafter referred to as CPU) executes processing which will be described below when the signals S1, S2, S3, Sa, Sb or Sc is received. Memories 23F and 23R store respectively the speed stages for forward and backward directions as commanded by the speed-stage command device 12, and a display 24 displays the memory contents of the memories 23F and 23R. This display 24 is disposed at a suitable place on the front panel before the operator's seat as shown in FIG. 3.

A driving circuit 25 selects and drives valve driving solenoids 26-F, 26-R, 26-1, 26-2 and 26-3 in the electric-hydraulically operated transmission having a planet gear (not shown) in accordance with a speed-stage setting signal coming from the CPU 22. Valves 27-F and 27-R respectively operated by the solenoids 26-F and 26-R select forward or reverse of the transmission by controlling the individual hydraulic cylinders (not shown) corresponding thereto, and Valves 27-1, 27-2 and 27-3 respectively operated by the solenoids 26-1, 26-2 and 26-3 select a speed stage among 1st, 2nd and 3rd speed stages in the forward or backward direction by controlling the corresponding hydraulic cylinders (not shown). For example, when the solenoid 26-F and the solenoid 26-1 are energized, the transmission becomes in the forward 1st speed stage.

The driving circuit 28 drives the electric-hydraulic clutch. More particularly, the circuit 28 individually drives motors 31L, 31R, 32L and 32R which operate respectively spools of a left clutch valve 29L, a right clutch valve 29R, a left brake valve 30L and a right brake valve 30R in accordance with the instruction of the CPU 22, whereby the circuit 28 can change the clutch engagement state with respect to the right and left crawler. Further, the positions of the valves 29L, 29R, 30L and 30R are respectively detected by sensors 34L, 34R, 35L and 35R such as potentiometers or the like, and the output of these sensors can be fed back to the CPU 22 through an A/D converter 33.

Figure 6B:
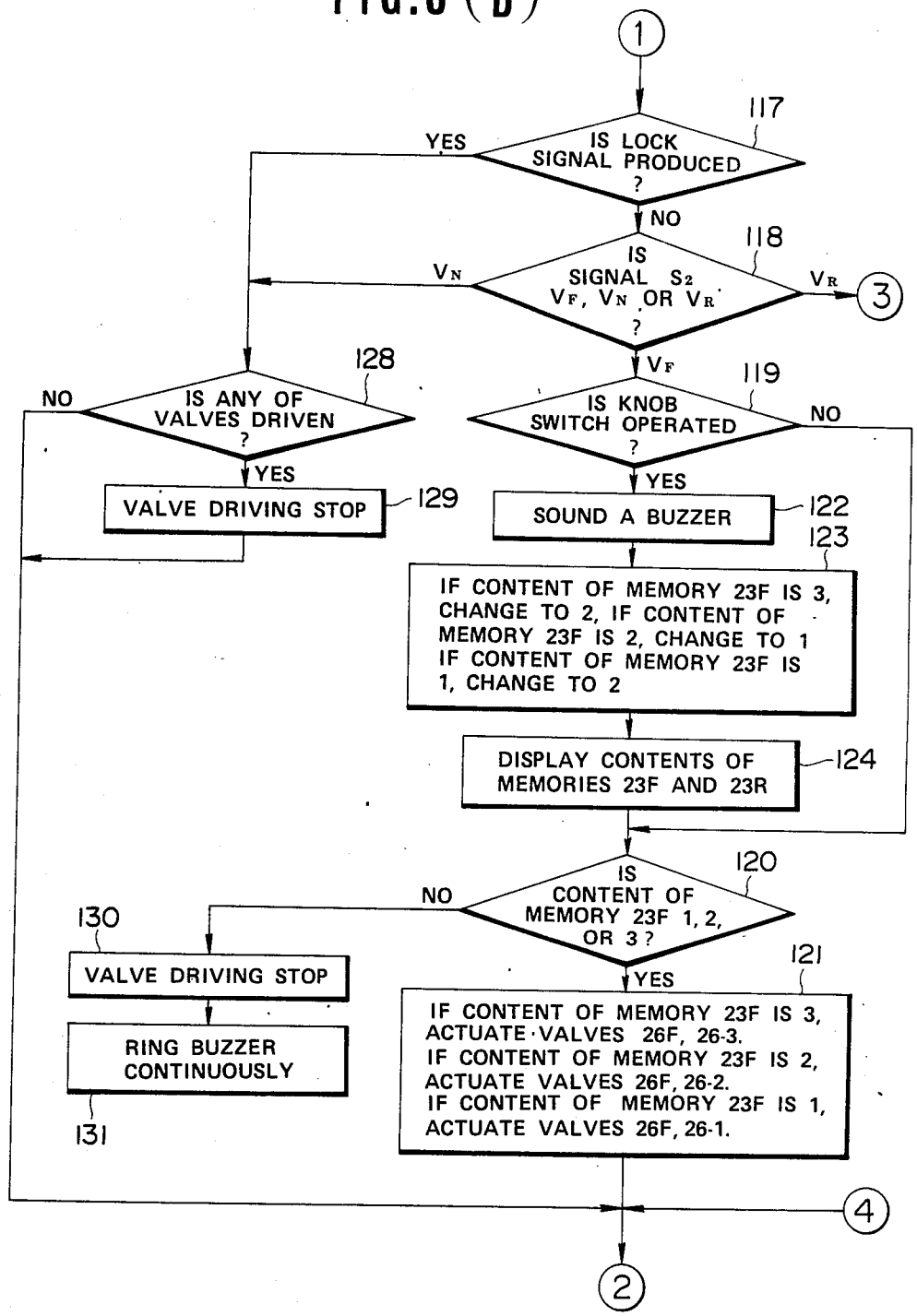
Figure 6C:
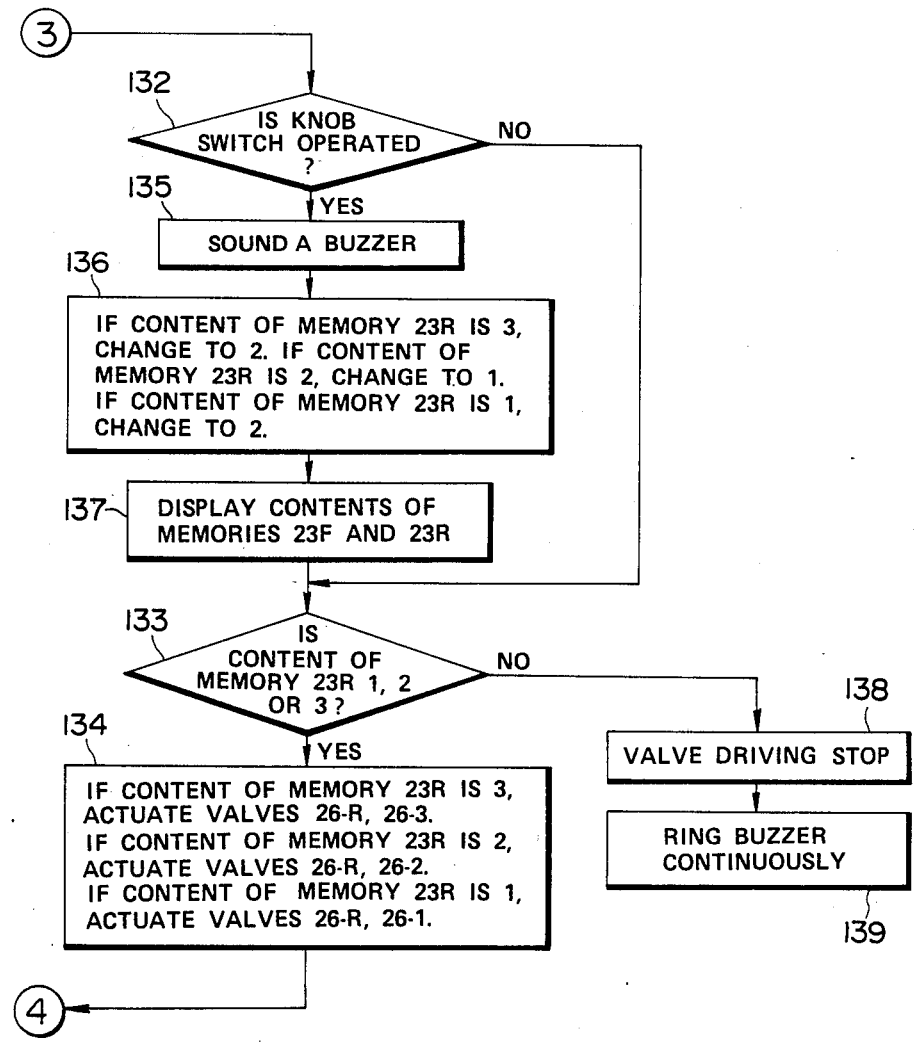

The operations of the driving control device of this embodiment will now be described with reference to the flow chart in FIG. 6 showing a processing sequence of the CPU 22.

Firstly, the CPU 22 loads a value 1 showing 1st-speed stage into a memory 23F and a memory 23R (Step 100). Then, it judges whether any of switches 12-1, 12-2 and 12-3 and 12-1', 12-2' and 12-3' of the speed-stage command device 12 is pushed (Step 101). When the judgment of Step 101 is "YES", the CPU 22, after sounding a buzzer (not shown) for a short time (Step 103), judges a combination of logic levels of signals Sa, Sb and Sc, which have been outputed from the signal generation circuit 20 in accordance with the relation as shown in the above Table (Steps 104 through 109). When the signals Sa, Sb and Sc have the logic levels of 1, 1 and 1; 1, 0 and 1; and 1, 1 and 0, values 1, 2 and 3 showing the forward speed stages are loaded respectively into the memories 23F. When the signals Sa, Sb and Sc have the logic levels of 0, 1 and 1; 0, 0 and 1; and 0, 1 and 0, values 1, 2 and 3 showing the reverse (backward) speed stages are loaded respectively into the memories 23R (Step 110 through 115).

For example, when the operator pushes the pushbutton switch 12-1 of the above speed-stage command device 12 to command the forward 1st speed stage so that signals Sa, Sb and Sc of 1, 1 and 1 from the signal generation circuit 20 are outputted, the value 1 is loaded into the memory 23F.

After displaying the memory contents of the memories 23F and 23R on the display 24 (Step 116), the CPU 22 then judges whether or not the lock signal S4 is being produced as output from the neutral lock switch 21 (Step 117). When the signal S4 is not being outputted, the CPU 22 judges as to which of the forward position, neutral position, and reverse position of pattern shown in FIG. 4 the lever 10 has been operated to in accordance with the output signal S2 of the potentiometer 14 (Step 118).

More specifically, when the lever 10 is operated to the "forward" position, to the "neutral" position, or to the "reverse" position, the values of the output signal S2 of the potentiometer 14 become $V_F$, $V_N$ and $V_R$, so that the CPU 22 judges the forward or reverse position of the lever 10 on the basis of these signal values.

Now, if the value of the signal S2 indicates $V_F$, i.e., if the lever 10 has been operated to the "forward" position, the CPU 22 judges whether or not the knob switch 11 mounted on the lever 10 has been operated, i.e., whether or not the same switch 11 has been closed (Step 119). When this judgement is "NO", the content of the memory 23F is checked (Step 120). The speed-stage setting signal actuating the valves 27F and 27-3, if the content of the memory 23F is 3; the speed-stage setting signal actuating the valves 27F and 27-3, if the content of the memory 23F is 2; and the speed-stage setting signal actuating the valves 27F and 27-1, if the content of the memory is 1 are respectively introduced as input into the driving circuit 25 to selectively actuate these valves. Thus, speed stages corresponding to the contents commanded by the above speed-stage command device 12 can be selected.

When the speed stage is selected as described above, and the knob switch 11 of the lever 10 is closed while the tractor is being driven at a specific speed, the judgement result of the above Step 119 becomes "YES". In such a case, the CPU 22 sounds the above mentioned buzzer for a short time (Step 122). Then, when the content of the memory 23F is 3, the CPU 22 changes this to 2; when it is 2, the CPU 22 changes this to 1; and when it is 1, the CPU 22 changes this to 2 (Step 123). Thus, the contents changed of the memory 23F are indicated on the display 24 (Step 124), and the processes shown in Steps 120 and 121 can be executed.

In the driving of the tractor, switching operation of the knob switch 11 is performed in the following cases.

When the tractor is being driven at a high speed of the 3rd or 2nd speed stage, the operator will often desire to make a gear change to a lower speed to avoid danger, in which case it may be troublesome for the operator to operate the switch of the speed-stage command device 12. Also, when the tractor is being driven at the 1st speed, the operator will sometimes desire to drive at the 2nd speed to raise the work efficiency, in which case it is desirable to change speed stages without operating the switch of the speed-stage command device 12. The knob switch 11 can be used in such cases so that changes of speed stage can be easily performed.

Furthermore, when the above Step 101 judgement is "NO", the CPU 22 immediately executes the content of Step 116. Also, when the Step 109 judgement is "NO", the CPU 22 checks whether or not any of the above valves 27-F, 27-R, 27-1, 27-2 and 27-3 is being driven (Step 125), and if any valve is being driven, the CPU 22 stops the driving of that valve (Step 126) and then rings continuously the buzzer (Step 127). Also, if no valve is being driven, the CPU 22 immediately executes the content of Step 127.

Further, when the Step 117 judgement result is "YES", i.e., when the above neutral lock switch is closed, and when the output voltage of the potentiometer 14 is judged to be $V_N$ in Step 118, i.e., when the lever is positioned at the neutral position as shown in FIG. 4, the CPU 22 judges whether or not any of the valves 27-F, 27-R, 27-1, 27-2 and 27-3 is being driven (Step 128).

When the result of this judgement is "YES", the CPU 22 stops the driving of the valve (Step 129) and places the transmission in the neutral state.

In the case where the tractor, for example, is to be parked, the switch 21 is closed, whereby even when the lever 10 is positioned at any other position than the neutral position as shown in FIG. 4, the transmission is forced to be locked in the neutral state.

Furthermore, when the Step 120 judgement result is "NO", i.e., when the content of the memory 23 is a value other than 1, 2, or 3 for some reason, the CPU 22 stops valves in driven state among the valves 27-F, 27-R, 27-1, 27-2 and 27-3 (Step 130) and continuously rings the buzzer thereafter (Step 131).

Also, when the value of the output signal S2 of the potentiometer is judged to be 0 in Step 119, i.e., when the lever 10 is judged to have been operated to the "Reverse" position as shown in FIG. 4, the CPU 22 executes a judgement process having the same content as that of Step 119 (Step 132). When the judgement result of Step 132 is "NO", the CPU 22 checks the content of the memory 23R (Step 133). When its content is 3, 2 and 1, the CPU 22 actuates respectively the valves 27-R and 27-3, the valves 27-R and and 27-2, and the valves 27-R and 27-1 (Step 134). Thus, when the lever 10 has been operated to the "Reverse" position, the speed stage corresponding to the reverse speed stage stored in the memory 23R is selected in the transmission.

Further, when the Step 132 judgement result is "YES", the CPU 22 executes a process conforming to the process content of Step 123 with respect to the memory 23R (Step 136) after it has executed the same process as that shown in the above Step 122 (Step 135) and further executes the same process as Step 124 (Step 137). Also, when the contents of the memory 23R are judged to be other than 3, 2 and 1 in Step 133, the CPU 22 executes successively the same process as that indicated in Step 130 and Step 131 (Step 138, 139).

Next, the steering operation will be described. The CPU 22 processing contents for the steering operation are not shown in FIG. 6.

When the lever 10 is operated by the operator to the "right turn" or "left turn" direction of the pattern shown in FIG. 4, a turning instruction signal S1 of values corresponding to the operating direction and the operating amount is produced as output from the potentiometer 13. The CPU 22 thereby judges, on the basis of the signal S1, the direction, right or left, in which the lever 10 has been actuated and at the same time detects the operation amount of the lever. The CPU 22 further introduces as input driving signals corresponding to the operation amount for the respective direction through the driving circuit 28 to the motor 31L and motor 31R.

The right and left clutches in the crawler-type tractor are normally in a connected state.

When the spool of either of the aforedescribed valves 29L and 29R is actuated beyond a prescribed amount, the clutch connected to the valve actuated by this spool is placed in a disconnected state through a hydraulic cylinder (not shown).

Accordingly, when the lever 10 is operated, for example, to the right turning direction beyond a prescribed amount, the right clutch assumes a disconnecting state to disconnect the power transmission to the right crawler, whereupon the tractor turns to the right.

When the right clutch assumes the disconnected state, the right crawler undergoes free rotation, which obstructs quick turning operation. Accordingly, in this example, the clutches and the brakes are intercoupled to operate interrelatedly. That is, when the right clutch, for example, moves to the disconnected state, the motor 32R drives in response to the output signal S1 of the potentiometer 13, whereby the right brake is applied to prevent free rotation of the right crawler.

Furthermore, when the brake pedal 18 shown in FIG. 3 is depressed, the CPU 22 actuates simultaneously the right and left brake valves 30R and 30L in response to the output signal S3 of the potentiometer 17, so that the tractor slows down or stops.

In the example of practice described above, the position of the lever 10 in the forward or reverse (backward) direction is determined by one of the high $(V_F)$, medium $(V_N$, and low $(V_R)$ values of the output signal S2 of the potentiometer 14, but limit switches which are closed or opened when the lever 10 is actuated to a respective position for forward, neutral or reverse can be, substituted, of course, for the above potentiometer.

Also, the example of practice carries out programming control by using a CPU, but the operation described above can also be obtained by a combination of logic circuits.

Further, in the embodiment described above, the speed-stage command device 12 is provided with the push button switches 12-1, 12-2 and 12-3 for forward and the push button switches 12-1', 12-2' and 12-3' for reverse, but since forward or reverse is selected by the actuation position of the lever 10, as indicated by the Step 118 of FIG. 6, the speed-stage command device can be constituted by three push button switches by changing a part of the process flow of the same figure. However, when the numbers of speed stages respectively for forward and reverse are different, it is necessary to provide exclusive push switches for each of forward and reverse as in the above described embodiment.

We claim:

1. A driving control device of a tractor, said tractor being of the type controlled by a human operator and having a transmission, said driving control device comprising:
   a speed-stage control panel including means operable by the tractor operator for selecting one of a plurality of predetermined speed stages and means for providing speed-stage selection signals in response to selection of tractor speed-stages by the operator of the tractor;
   speed-stage command means for receiving speed-stage selection signals from said control panel and for providing instruction data corresponding to the selected tractor speed stages;
   memory means for storing instruction data provided by the speed-stage command means;
   means for driving said transmission in accordance with the instruction data stored in said memory;
   switch means, activated by the operator of the tractor, for providing an automatic speed change signal when activated and thereby signalling that a change in tractor speed has been selected by the tractor operator; and
   means, coupled to said switch means and responsive to said automatic speed change signal, for changing the instruction data stored in said memory means to different instruction data, said different instruction data being a function of the instruction data stored in said memory prior to occurrence of said automatic speed change signal.

2. The driving control device of claim 1 wherein said device further comprises means, electrically coupled to said switch means and responsive to said automatic speed change signal, for providing a warning signal upon receipt of each said automatic speed change signal.

3. A driving control device of a crawler type tractor of the type controlled by a human operator and having a transmission, a directional control lever for providing directional control of said tractor, and a speed command means for enabling manual selection of tractor speed by the operator, comprising:
   a neutral lock switch operable by the operator;
   neutral lock signal means, coupled to said neutral lock switch, for producing an electrical signal in response to operation of said neutral lock switch; and
   means, electrically coupled to said neutral lock signal means and responsive to the electrical signal provided by said neutral lock signal means, for placing and maintaining the transmission in a neutral state irrespective of the operation of said control level or said speed command means.

4. The driving control device of claim 3 wherein said transmission includes electrically controlled hydraulic valves, said valves being operable between open and closed states, and means for electrically controlling the operation of said valves, wherein said means responsive to said neutral lock signal further includes means, electrically coupled to said means for electrically controlling, for determining if said hydraulic valves are operated in said open or closed state upon receipt of said neutral lock signal.

5. A driving control device of a crawler type tractor having forward and reverse dierections of travel and futher having left and right directions associated therewith, and having a transmission and steering clutches, said driving control device comprising:
   a lever which can be operated in a first direction to a first position and a second position corresponding to the forward or reverse directions of travel of said tractor, respectively, and can be operated in a second direction to positions corresponding to the right or left directions of said tractor, respectively;
   a first sensor which provides a forward instruction output signal and a reverse instruction output signal when said lever is operated to said first and second positions, respectively;
   a second sensor which outputs a turning instruction signal corresponding to the position of said lever in the second direction;
   a speed-stage command device which provides instruction data for speed stages by switching operation;
   a memory which stores the instruction data provided by the speed-stage command device;
   means for driving said transmission in accordance with the instruction data stored in said memory and the output signals of said first sensor;
   means, electrically coupled to said second sensor, for driving said steering clutches in accordance with said turning instruction signal provided by said second sensor;
   a knob switch mounted on said lever; and
   means for changing the instruction data stored in said memory to altered data in response to a signal outputted from said knob switch as a result of operation of said knob switch and wherein said altered data is derived from the instruction data stored in said memory prior to operation of said knob switch.

6. A driving control device of a crawler type tractor having forward and reverse directions of travel and further having left and right directions associated therewith, and having a transmission and steering clutches, said driving control device comprising:
   a lever which can be operated in a first direction to a first position and a second position corresponding to the forward or reverse directions of travel of said tractor, respectively, and can be operated in a second direction to positions corresponding to the right or left directions of said tractor, respectively;
   a first sensor which provides a forward instruction output signal and a reverse instruction output signal when said lever is operated to said first and second positions, respectively;
   a second sensor which outputs a turning instruction signal corresponding to the position of said lever in the second direction;
   a speed-stage command device which provides instruction data for speed stages by modifying the values of said instruction data for different speed stages;
   a memory which stores the instruction data provided by the speed-stage command device;
   means for driving said transmission in accordance with the instruction data stored in said memory and the output signals of said first sensor;
   means, electrically coupled to said second sensor, for driving said steering clutches in accordance with said turning instruction signal provided by said second sensor;
   a neutral lock switch; and
   means for placing the transmission in a neutral state when said neutral lock switch is operated.

* * * * *